United States Patent
Tanimura

(10) Patent No.: US 6,257,813 B1
(45) Date of Patent: Jul. 10, 2001

(54) SCREW CLAMPING DEVICE WITH AUTOMATIC CLAMPING MEANS

(76) Inventor: Kazuaki Tanimura, 26-32, Kamishimadai, Tanabe-shi, Wakayama (JP)

(*) Notice: Subject to any disclaimer, the term of this patent is extended or adjusted under 35 U.S.C. 154(b) by 0 days.

(21) Appl. No.: 09/486,120

(22) PCT Filed: Jul. 6, 1998

(86) PCT No.: PCT/JP98/03070
§ 371 Date: May 8, 2000
§ 102(e) Date: May 8, 2000

(87) PCT Pub. No.: WO00/01509
PCT Pub. Date: Jan. 13, 2000

(51) Int. Cl.[7] .............................. B23P 19/06; F16B 39/10
(52) U.S. Cl. .......................... 411/119; 411/231; 411/536; 411/372.5
(58) Field of Search .................................... 411/536, 231, 411/424–433, 372.5, 372.6, 373, 119, 120

(56) References Cited

U.S. PATENT DOCUMENTS

| | | | |
|---|---|---|---|
| 292,301 | * | 1/1884 | Haley . |
| 582,424 | * | 5/1897 | Hunt . |
| 1,829,940 | * | 11/1931 | Monckmeier . |
| 4,801,231 | * | 1/1989 | Everman . |
| 4,812,096 | * | 3/1989 | Peterson . |
| 5,207,543 | * | 5/1993 | Kirma . |

FOREIGN PATENT DOCUMENTS

| | | | |
|---|---|---|---|
| 490519 | * | 1/1930 | (DE) . |
| 642034 | | 6/1994 | (JP) . |
| 8-215952 | | 8/1996 | (JP) . |
| 8215952 | | 8/1996 | (JP) . |

* cited by examiner

*Primary Examiner*—Flemming Saether
(74) *Attorney, Agent, or Firm*—Birch, Stewart, Kolasch & Birch, LLP

(57) ABSTRACT

An automatic screw clamping device for automatically tightening bolts fitted in a metallic mount member, which is hard to nail includes a casing (2), a rotator (4) disposed in the casing (2) in a manner that the rotator may rotate and move up and down, a biasing member (5) connected with the rotator (4) and the casing (2), and a covering member for covering over the casing (2). Fitments are provided on the lower end of the casing (2). The rotator (4) includes an inner periphery having an engaging portion (41) that can unrotatably mesh with the clamped member (n), and includes an outer periphery with a locking portion (42) which is unrotatably lockable to the casing (2). The rotator (4) locked to the casing (2) is engaged with the clamped member (n) to press the casing (2) downward. This may cause the casing (2) to be detached from the rotator (4), then the casing (2) turns and the fitments (71) enter into the corresponding fitment-receptive portions (82) of the washer member (8) disposed beneath the clamped member (n) until the casing (2) is fixed to the washer member (8), whereby the rotator (4) can be maintained in a position where the clamped member (n) is biased in a direction when being tightened.

1 Claim, 15 Drawing Sheets

(A)

(A)

(B)

(A)

(B)

(A)

(B)

(A)

(B)

(A)

(B)

(A)

(B)

(A)

(B)

SCREW CLAMPING DEVICE WITH AUTOMATIC CLAMPING MEANS

This application is the national phase under 35 U.S.C. § 371 of PCT International Application No. PCT/JP98/03070 which designated the United States of America.

TECHNICAL FIELD

The present invention relates to an automatic screw clamping device clamped members such as bolt, nut and the like which are attached to the mount element.

BACKGROUND ART

The clamped members such as bolt, nut, and the like, have been so far widely used for fastening together various kinds of building articles or railroad ties and rails. For instance, referring to the railroad ties and rails, as indicated in FIG. 14, a press spring 103 having a plate-like portion 102 laid over between a tie 100 and a rail 101 is pressed down by clamping a bolt n to the tie 100 to fix the rail 101 on the tie 100. However, if the rail 101 is subjected to vibration repeatedly, the bolt n may loosen automatically even though the bolt n undergoes the biasing force of the press spring 103.

On the other hand, for instance, referring to the wooden buildings, columns and beams are fixed directly to each other using building strap bolts, but even if a nut is completely clamped down, or a nut having a function of stopping rotation is used, there may still yield a gap between the nut, column, and beam when the lumbers used dry off to such a degree that the column and beam shrinks and the nut can no longer press down on the column and achieve its clamping function. Such being the case, the inventor of the present invention has invented an automatic clamping device for strap bolt in order to solve this task. As can be seen in FIG. 15, this specific device comprises a cylindrical rotator a, a tubular casing b for receiving the rotator a in a manner that the latter is rotatable and slidable axial and vertical, and a coiled spring c wound around the rotator a to give the turning effort to the rotator a, wherein the rotator a has an engaging portion a1 on the inner periphery thereof for receiving a nut n which is threadedly engaged with a strap bolt, and a projection a2 extending in an outward direction of the diameter on the outer periphery of the upper end. Also on the lower end of the casing b a drive-fit/fixing means b1 such as a nail, and on the inner periphery a depression b2 for receiving the projection a2 in a manner that the latter is kept unrotatable. With the nut n fitted in the engaging portion a of the rotator a, and affixing the casing b by the drive-fit/fixing means b1 in the column or beam as a mount element with the nut attached thereto, the rotator a slides toward the upper end of the casing b, then, the projection a2 goes out of the depression b2, and the rotator a biased by the coiled spring c gives a turning effort to the nut n fitted in the engagement portion so that the nut n can always be held in an energized position. With the nut n being kept operative at all times, if the lumber becomes dry and the gap between the nut n and the column becomes wider, the nut n will automatically turn under the influence of the coiled spring c, whereby the close contact between the nut n and columun h1 can be maintained.

Although the casing b can be fixed by driving into the wood, the drive-fit/fixing means b1, such as nail provided on the upper end of the casing b, the metallic press spring 103 affixed in the railroad rail 101 as shown in FIG. 14 is kept pressed down by the bolt n, the casing b can not be fixed to the tie by the driven fixing means bl such as a nail because the metallic press spring 103 is disposed around the bolt n. Consequently, it would be difficult to adapt the automatic clamping device for building strap bolt as illustrated by FIG. 15 to bolt or nut fitted in the metallic mount element 101, 103.

In view of the circumstances, as described above the first object of the present invention provide an automatic screw clamping device which is capable of preventing a bolt fitted in the metallic mount element from loosening by retightening the bolt.

A second object of this invention is to provide an automatic screw clamping device which can be readily and for a short time fitted to the metallic mount element. A third object of the present invention is to provide an automatic screw clamping device for fixing a bolt to a railroad rail, which may be easily fitted to the fixing bolt for railroad rail. The fixing bolt is secured to the railroad rail in order to prevent the fixing bolt from loosening by automatically retightening the bolt.

A fourth object of the present invention is to provide an automatic screw clamping device which, while in use with nut or bolt, may be easily identified and detected even if it has been removed from the nut or bolt by other person with the intention of loosening the latter.

DISCLOSURE OF THE INVENTION

The present invention can solve the above-described tasks by providing automatic screw clamping devices by containing the following characteristic features.

A first invention of the present application is provided with a biasing member 5, 110 for biasing clamped member n such as bolt, nut and the like in a direction in which the latter runs for being tightened.

Owing to the arrangement that the biasing member 5, 110 is in an unrotatable engagement with the clamped member n at one end thereof, the clamped member n is adapted to be biased in a direction in which it runs for being tightened.

There is provided fitting means 71, 112, 82, 802 for fitting the other end of biasing members 5, 110 on a mount element 8, 800 with the clamped member n attached thereto. The fitting means 71, 112, 82, 802 is intended to allow the other end of the biasing member 5, 110 to move by the biasing force applied to the other end of the biasing member 5, 110, thereby, upon such a movement, putting the other end of the biasing member 5, 110 and the mount element 8, 800 together.

In a second invention of the present application, the fitting means in accordance with the first invention comprises fitment 71, 112 provided at one of the other end of the biasing member 5, 110 and the mount element 8, 800, and fitment-receptive portion 82, 802 at the other. The fitment 71, 112 is relatively movable toward the fitment-receptive member 82, 802 by the biasing force applied to the fitment 71, 112, whereby upon such a movement, the fitment 71, 112 is received by the fitment-receptive member 82, 802.

In a third invention of the present application, the mount element in accordance with the first or second invention comprises a clamping object of clamping the clamped member, and a washer member 8, 800. Said washer member 8, 800 is disposed between the clamping object and the clamped member n so as to get in contact with the other end of the biasing member 5, 110.

A fourth invention of the present application comprises a tubular casing 2, a rotator 4 disposed within said casing 2 in a manner that the former may move axially and vertically, and biasing member 5.

The biasing member 5 is connected with the rotator 4 at one end thereof, and the casing 2 at the other end, whereby the casing 2 and rotator 4 are given by the biasing force of the biasing member 5 a turning effort by which both the members can rotate relative to each other.

The rotator 4 is provided with an engaging portion 41 at the lower end thereof, whereby it can unrotatably engage the clamped member n such as bolt, nut and the like.

The casing 2 and rotator 4 include locking means 32, 42 which are removably lockable, respectively. Therefore, the rotator 4 can be maintained within the casing 2 in a biased position where it holds a given turning effort, and the interlock between the casing 2 and rotator 4 can be removed as the rotator 4 is actuated to move upward relative to the casing 2.

There is provided a fitting means 71, 82 of connecting the casing 2 and the mount element 8 with clamped member n attached thereto in an unrotatable manner. The fitting member 71, 82 acts to turn the casing 2 under the influence of the biasing force of the biasing member 5 applied to the casing 2, and upon such rotary motion, the casing 2 and the mount element 8 are unrotatably joined together, and the rotator 4 as engaged with the clamped member n is operative to bias the clamped member n in a direction in which the latter runs for being tightened.

In the first to third inventions of the present application as thus arranged, the attachement of the other end of the biasing member 5, 110 to the mount element 8, 800 is effected by a biasing force applied to the other end of the biasing member 5, 110 and counter to a direction in which the clamped member n runs for being tightened. This makes it possible to also fix the other end of the biasing member 5, 110 to a member which is hard to nail, so that the biasing member can be held in a position to bias the clamped member n in a direction in which the latter runs for being tightened. On top of that, the mounting operation may be simplified such that the other end of the biasing member 5, 110 can be spontaneously attached to the fitting member 8, 800 by the use of the elasticity of the coil spring 1 without the necessity of driving nails as in the past.

In the fourth invention of the present application, the mounting operation can be simply achieved, too; in order to remove the locked joint between the casing 2 and the rotator 4, all what can be done is to engage the clamped member n with the rotator 4. This may help put the casing 2 in rotary motion under the influence of the biasing force of the biasing member 5 applied to the casing 2, and upon such rotary motion, the casing 2 may be unrotatably attached to the fitting member 8 in a natural manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description give hereinbelow and the accompanying drawings which are given by way of illustration only, and thus are not limitative of the present invention, and wherein.

BEST MODE FOR CARRYING OUT THE INVENTION

Now, the embodiments embodying the invention will be described with reference to the drawings.

Figure 1:
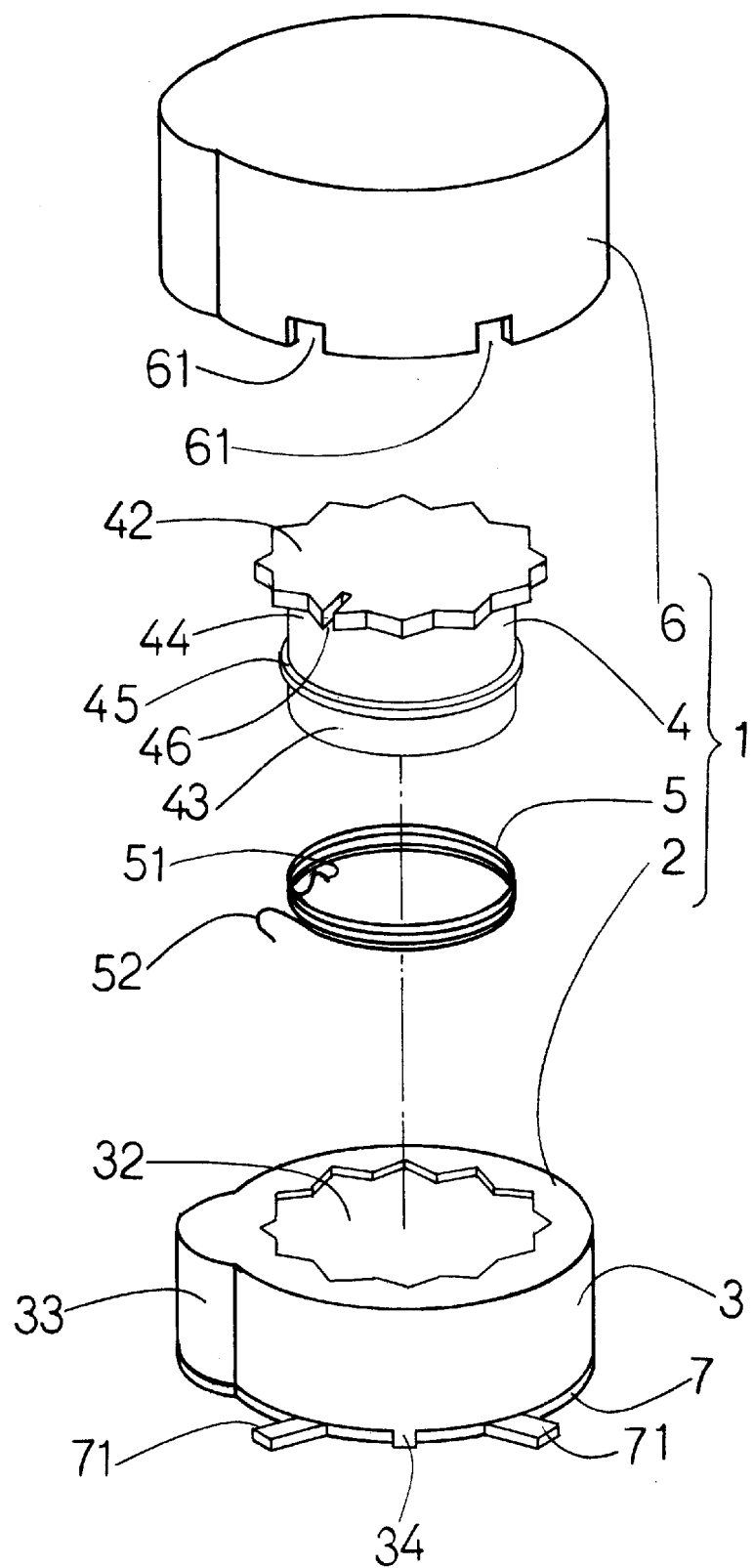
FIG. 1 is an exploded perspective view of the automatic screw clamping device in accordance with the first embodiment of the present invention.

FIG. 1 is an exploded perspective view of an automatic screw clamping device in accordance with a first embodiment of the present invention.

The automatic screw clamping device of the first embodiment comprises a cylindrical casing 2, a rotator 4 rotatably disposed within the casing 2, a biasing member 5, and a covering member 6.

Figure 3A:
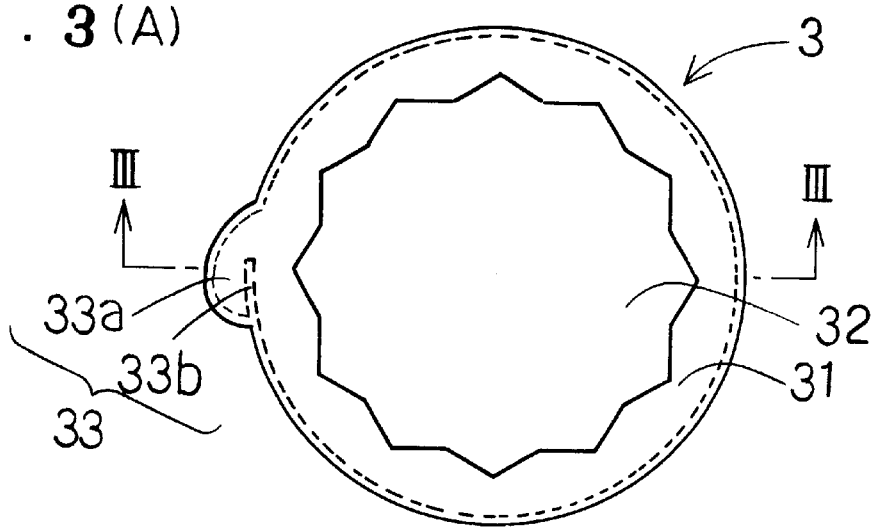
FIG. 3(A) is a front view of a casing body, (B) a bottom view of same, and (C) a sectional view taken along III—III of (A)
Figure 3B:
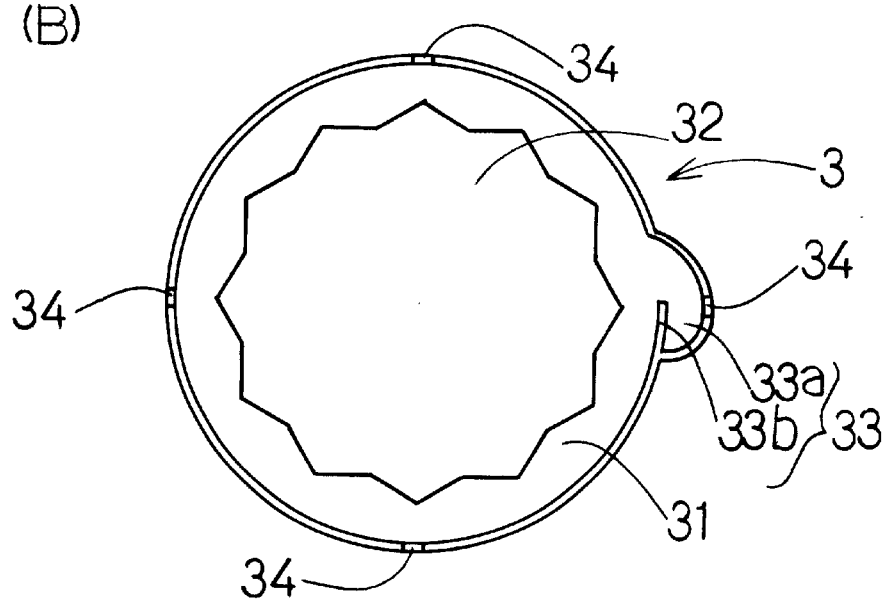
Figure 3C:
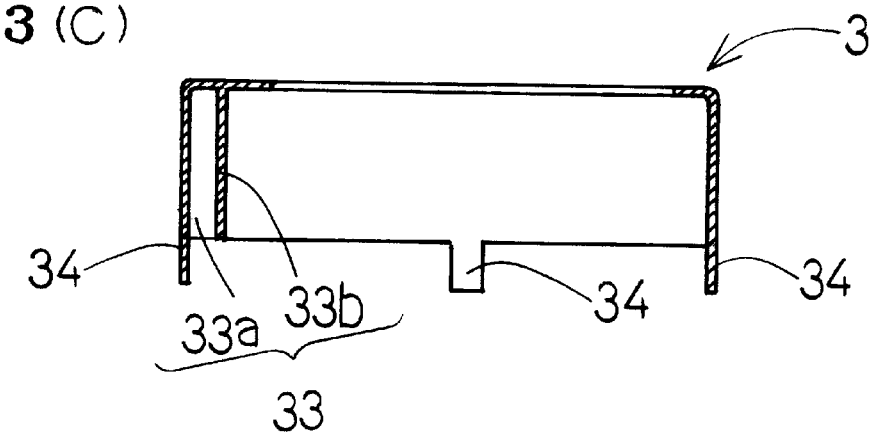

The casing 2 comprises a tubular casing body 3 and a disc-like bottom plate 7 mounted on the casing body 3. The casing body 3 has on the upper end thereof an upper projecting portion 31 protruding in an inward direction of the diameter, as seen in FIGS. 3(A)(B)(C). The inner periphery of this upper projecting portion 31 provides a locking hole 32 with substantially twenty-four straight sides for stopping rotation. There is provided a spring locking/receiving portion 33 in the inner periphery of the casing body 3. This specific spring locking/receiving portion 33 is intended to lock and receive a coil spring 5 as biasing member 5, which will be detailed afterward, at its lower end, including a spring-receptive portion 33a formed by a part of the inner periphery of the casing body 3 so as to extend in an outward direction of the diameter, and a spring catching piece 33b extending from one end of the spring-receptive portion 33a toward a peripheral direction of the casing body 3.

Figure 4:
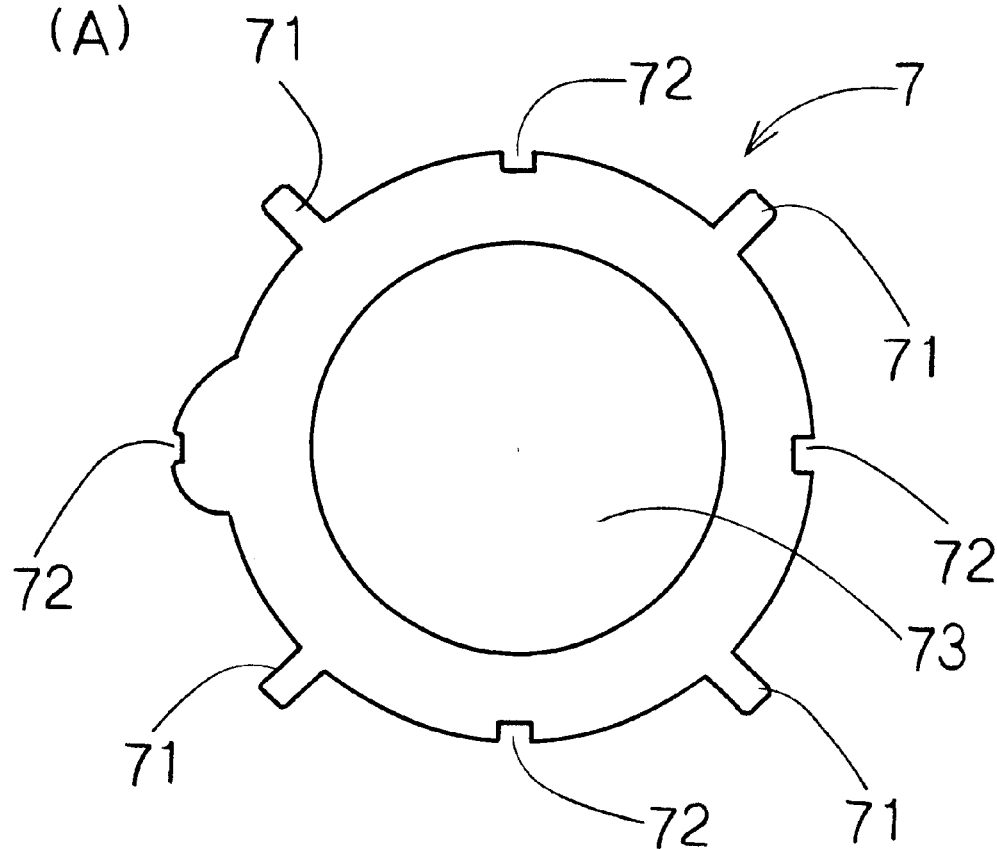
FIG. 4(A) is a front view of a bottom plate, and (B) a side view of same.
Figure 4B:
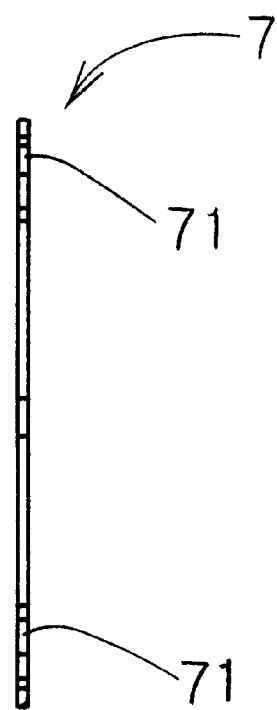

As shown by FIGS. 4(A)(B), the bottom plate 7 matches with the casing body 3 in the shape of the outer periphery. The bottom plate 7 has four fitments 71 . . . 71 formed on the outer periphery thereof to project in an outward direction of the diameter. The bottom plate 7 is fixedly secured to the lower end of the casing body 3. More specifically, the bottom plate 7 is placed on the lower face of the casing body 3 so that the fixing pieces 34 . . . 34 are fitted into fit-in holes 72 . . . 72 provided on the outer periphery of the bottom plate 7, and the fixing pieces 34 . . . 34 projecting from the fit-in holes 72 . . . 72 downwardly of the bottom plate 7 are bent toward the inside of the diameter so that the fixing pieces 34 . . . 34 may be securely fixed to the casing body 3. The bottom plate 7 which has been fixed to the casing body 3 in this way provides a lower face of the casing 2 and a through hole 73 formed in the inner periphery thereof for receiving the rotator 4.

Figure 2A:
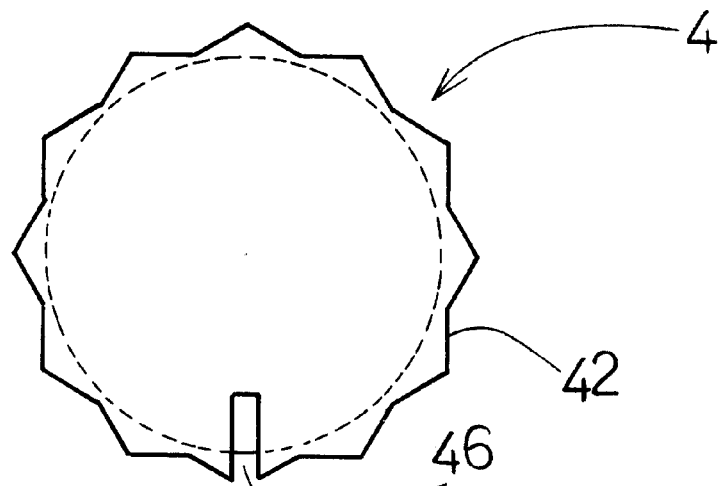
FIG. 2(A) is a flat view of a rotator, (B) a front view of same, and (C) a bottom view of same.

As illustrated in FIGS. 2(A)(B)(C), the rotator 4 has an engaging hole 41 formed on the lower side to extend from the lower face to the upper side. This engaging hole 41 is intended to retain clamped members such as nut or bolt against turning. As for the shape of the engaging hole 41, hexagon will do in order to correspond to hexagonal nut or bolt. In this embodiment, however, said engaging hole 41 is provided with multiple straight sides suitable for easier engagement with hexagonal bolt or nut.

Figure 7:
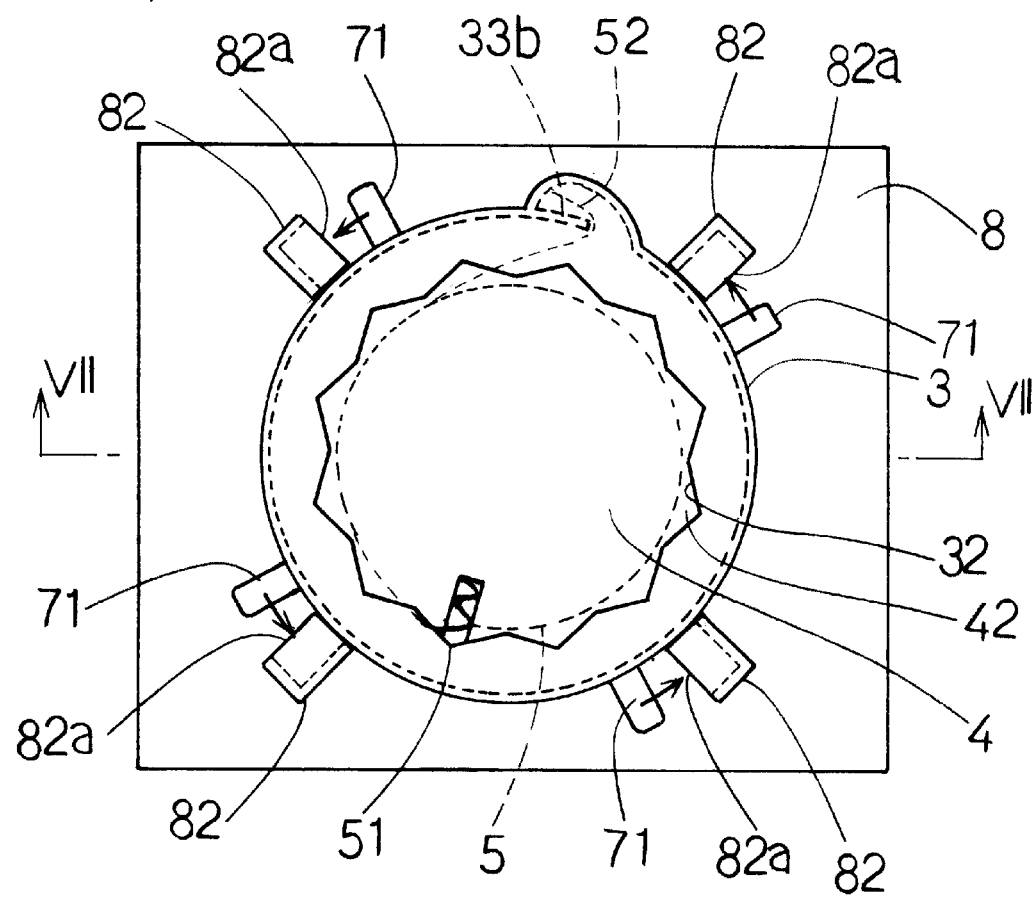
FIG. 7(A) is a plan view showing the state of the rotator fixed to the casing and held in engagement with a fixing bolt for rail, and (B) an enlarged sectional view of same taken along the line VII—VII of (A)
Figure 7:
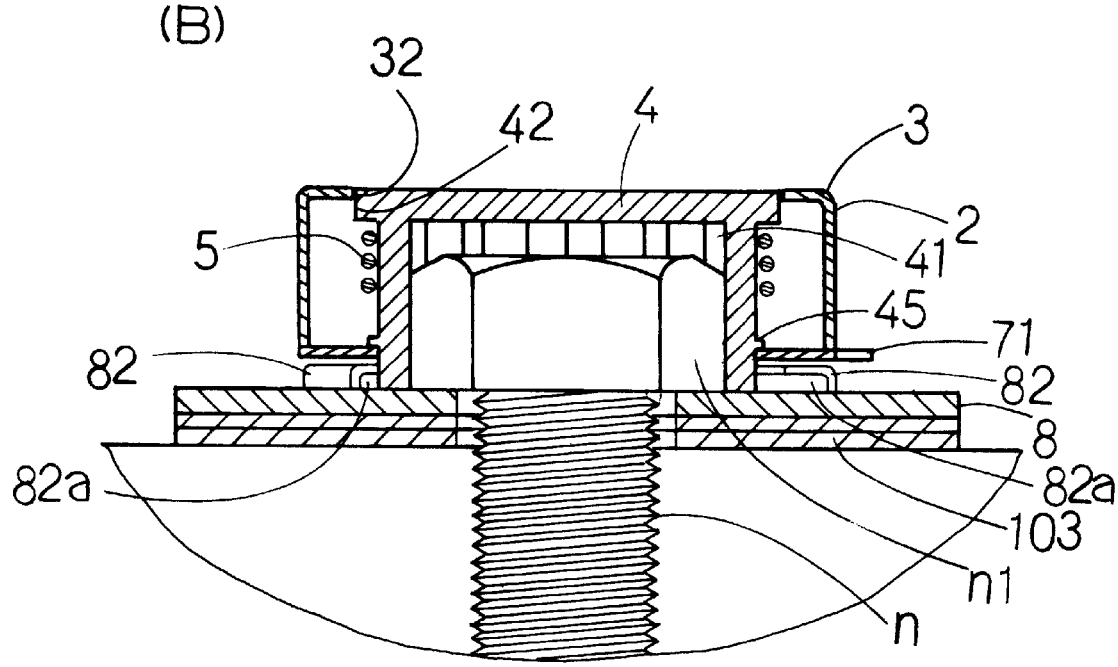
Figure 8:
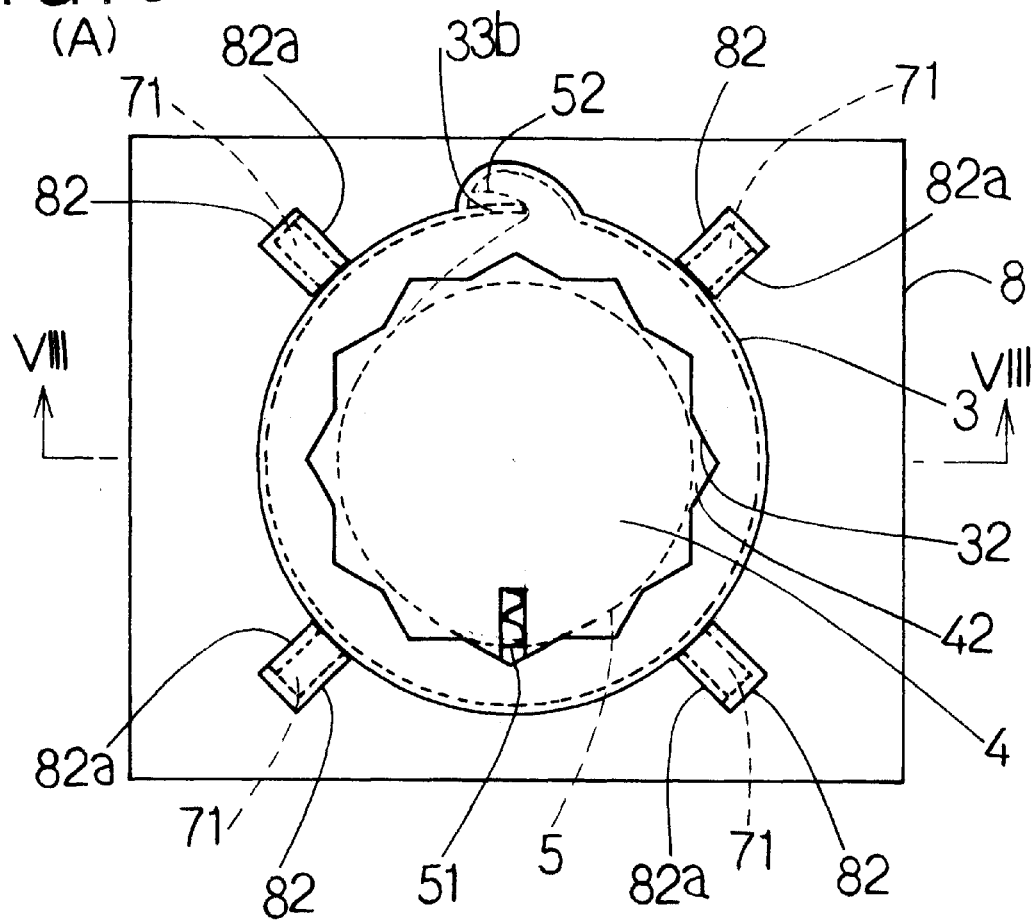
FIG. 8(A) is a plan view showing the state where fitments of the casing are encased in corresponding fitment-receptive portions of the washer member while the rotator held in engagement with the fixing bolt for rail rests unlocked from the casing, and (B) an enlarged sectional view taken along the line VIII—VIII of (A)
Figure 8:
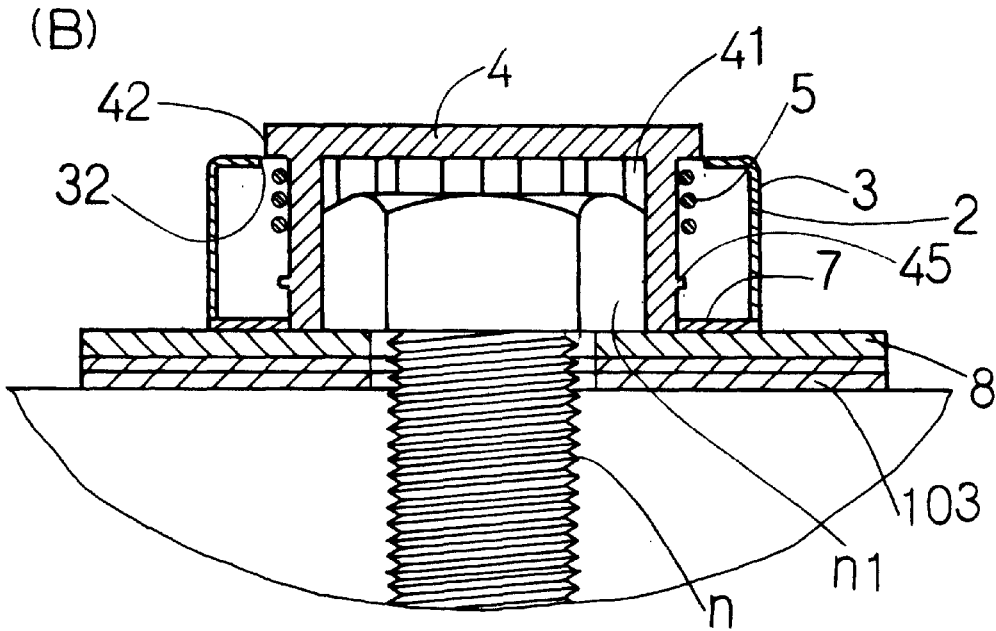

The rotator 4 has locking portion 42 having twenty-four straight sides formed on the upper periphery thereof for lockably fitting in the locking hole 32 of the casing body 2. In the lower side of the outer periphery of the rotator 4, there are provided a spring fit-on portion 44, an inserting portion 43 formed in the lower side of the spring fit-on portion 44, and a stop portion formed between the spring fit-on portion 44 and the inserting portion 43. The spring fit-on portion 44 is intended for fitting spring 5 thereon, and has a diameter smaller than the locking portion 42. The inserting portion 43 is substantially equal to that of the through hole 73 of the bottom plate 7 in the casing 2, and adapted to enter into and go downwardly of the casing 2 until it fits into the through hole 73. The stop portion 45 is made in diameter smaller than locking hole 32 of the casing 2, and larger than the through hole 73. The stop portion 45 may be stopped by abutting on the peripheral portion of the through hole 73 of the bottom plate 7 with the inserting portion 43 of the rotator 4 fit in the casing being received by the through hole 73 of the casing 2. With the stop portion 45 remaining in position in the peripheral portion of the through hole 73 of the bottom plate 7, the locking portion 42 of the rotator 4 may be brought into a locked position in the locking hole 32 of the casing 2, as shown in FIG. 7(B). FIG. 8(B) shows that at the time when the inserting portion 43 jutting downwardly of the casing 2 is pushed upward to get into the casing 2 and move in an upward direction until the lower end of the rotator 4 substantially meets the lower face of the bottom plate 7 of the casing 2, the locking portion 42 of the rotator 4 comes off from the locking hole 32 of the casing 2 and upward in such a manner that both the members will be detached one from another, and the rotator 4 will become rotatable relative to the casing 2.

Figure 2B:
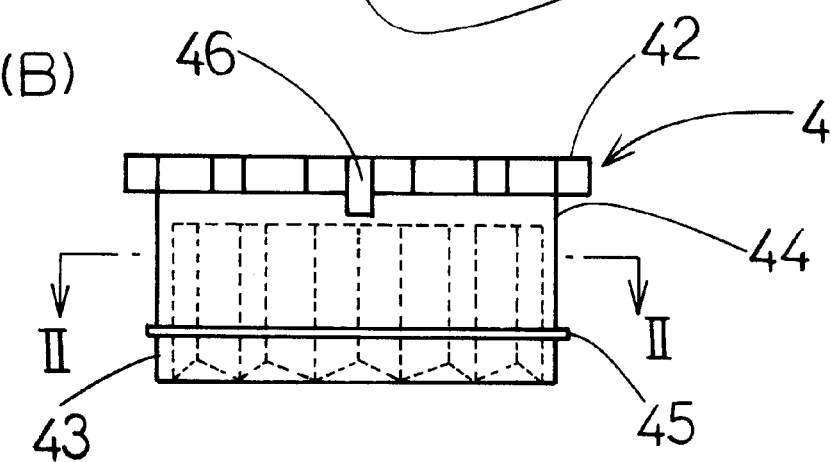
Figure 2C:
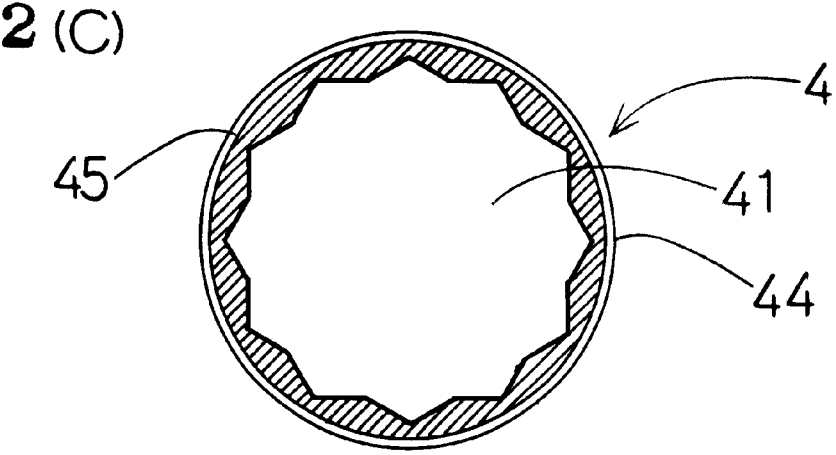

As shown in FIG. 2, a locking groove 46 for locking the upper end of the coil spring 5 is formed at the rotator's side to extend from the locking portion 42 to the spring fit-on portion 44 in the rotator 4, having a predetermined depth ranging from the outer periphery inward of the diameter.

In this embodiment, the biasing member 5 is constituted by elastic coil spring 5 which is produced by winding a copper wire, as shown in FIG. 1. The coiled spring 5 has an upper lock-fit portion 51 formed in the upper end thereof. Said upper lock-fit portion 51 is intended to be locked to the locking groove 46 of the rotator 4. As shown in FIG. 7(A) and FIG. 8(A), the upper lock-fit portion 51 is bent in an inner direction of the diameter and made waveform, each wave having an amplitude larger than the width of the locking groove 46 of the rotator 4. There is provided a lower lock-fit portion 52 in the lower end of the coil spring 5. The lower lock-fit portion 52 is intended to be locked by the spring-receptive portion 33 of the casing 2, and it is bent in an outward direction of the diameter into a form of the alphabetical U.

When the upper lock-fit portion 51 of the coil spring 5 is forced into the locking groove 46 of the rotator 4 to take its locked position and at the same time, the lower lock-fit portion 52 is hooked on the spring hooking piece 33b of the spring-receptive portion 33 of the casing 2, the rotator 4 and casing 2 are connected with each other through the coil spring 5. Then, if the rotator 4 is turned counterclockwise relative to the case 2, the coil spring 5 is jerked into so a tight position as to store elasticity sufficient to urge the rotator 4 to turn clockwise, and this spring-biased position of the rotator 4 may be retained by locking together the locking portion 42 of the rotator 4 and the locking hole 32 of the casing 2, as seen in FIG. 7(B). However, with the rotator 4 remaining in the spring-biased position will be yielded a force which may make the coil spring 5 to return to its original diameter, so that the upper lock-fit portion 51 sitting in the locking groove 46 at rotator side may slip on the locking groove 46 at rotator side and go outside of the diameter. In accordance with the present embodiment, since the upper lock-fit portion 51 in the form of waves each having larger amplitude than the width of the locking groove 46 of the rotator 4 is forced into the locking groove 46, there is no risk of the upper lock-fit portion 51 coming off from the locking groove 46 to ensure that the elasticity of the coil spring 5 will be maintained.

Figure 5:
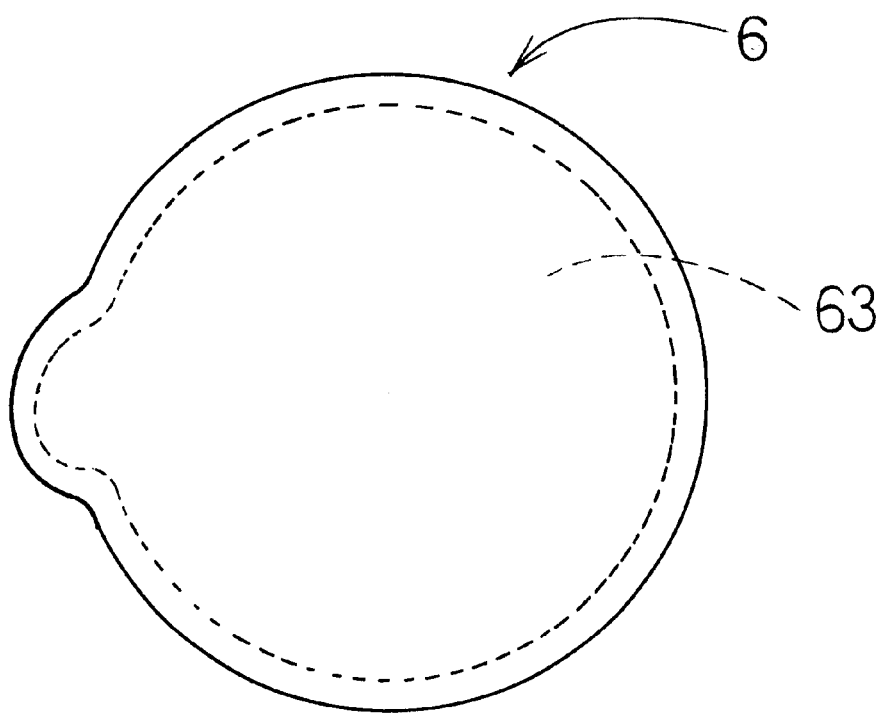
FIG. 5(A) is a front view of a covering member, and (B) a sectional view taken along the line V—V of (A)
Figure 5:
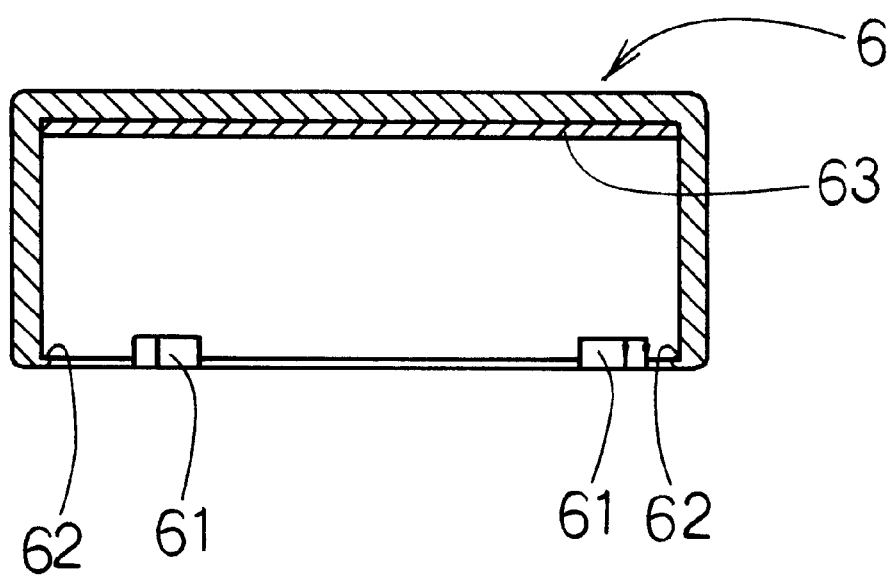

In this embodiment, the covering member 6 is made of transparent synthetic resin. As shown in FIGS. 5(A)(B), its inner peripheral shape is substantially identical to the outer peripheral shape of the casing 2, and there are provided in the lower end fitment-receptive holes 61 . . . 61 for receiving fitments 71 . . . 71 so that the each fitment having a length extending from the upper end to the lower end of the casing 2 may be thrust home into the hole 61. There is provided a slip-preventive projection 62 in the inner periphery of the lower end of the covering member 6. The slip-preventive projection 62 is intended to prevent the covering member 6 spreading over the casing 2 from slipping out of the casing 2. It is positioned inwardly of the diameter to extend over the entire inner periphery of the lower end. There is provided a light reflecting member 63 at the rear side of the upper face of the covering member 6 in order to reflect light beams coming through the upper face of the covering member 6.

Next, the usage for the automatic screw clamping device thus arranged as set forth above will be described by instancing a case where this device may be used in a rail fixing bolt n which serves to fix the rail to the ground.

Figure 6:
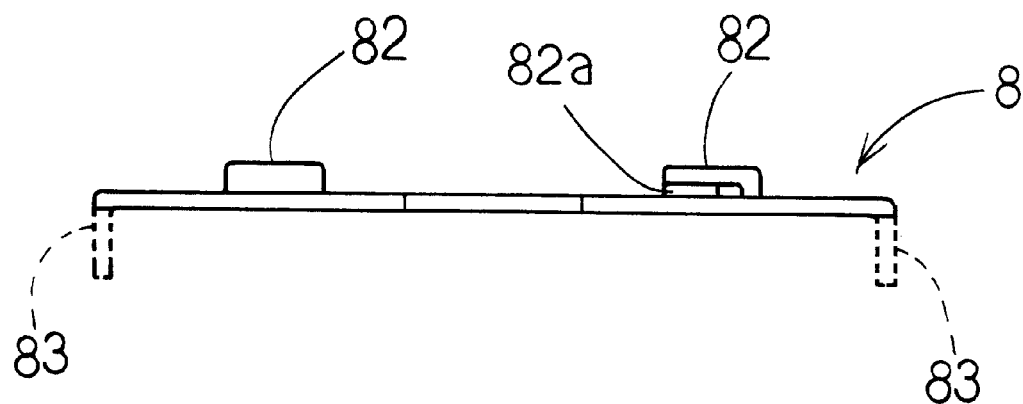
FIG. 6(A) is a front view of a washer member for use in the automatic screw clamping device of the first embodiment, and (B) a front view of same.
Figure 6:
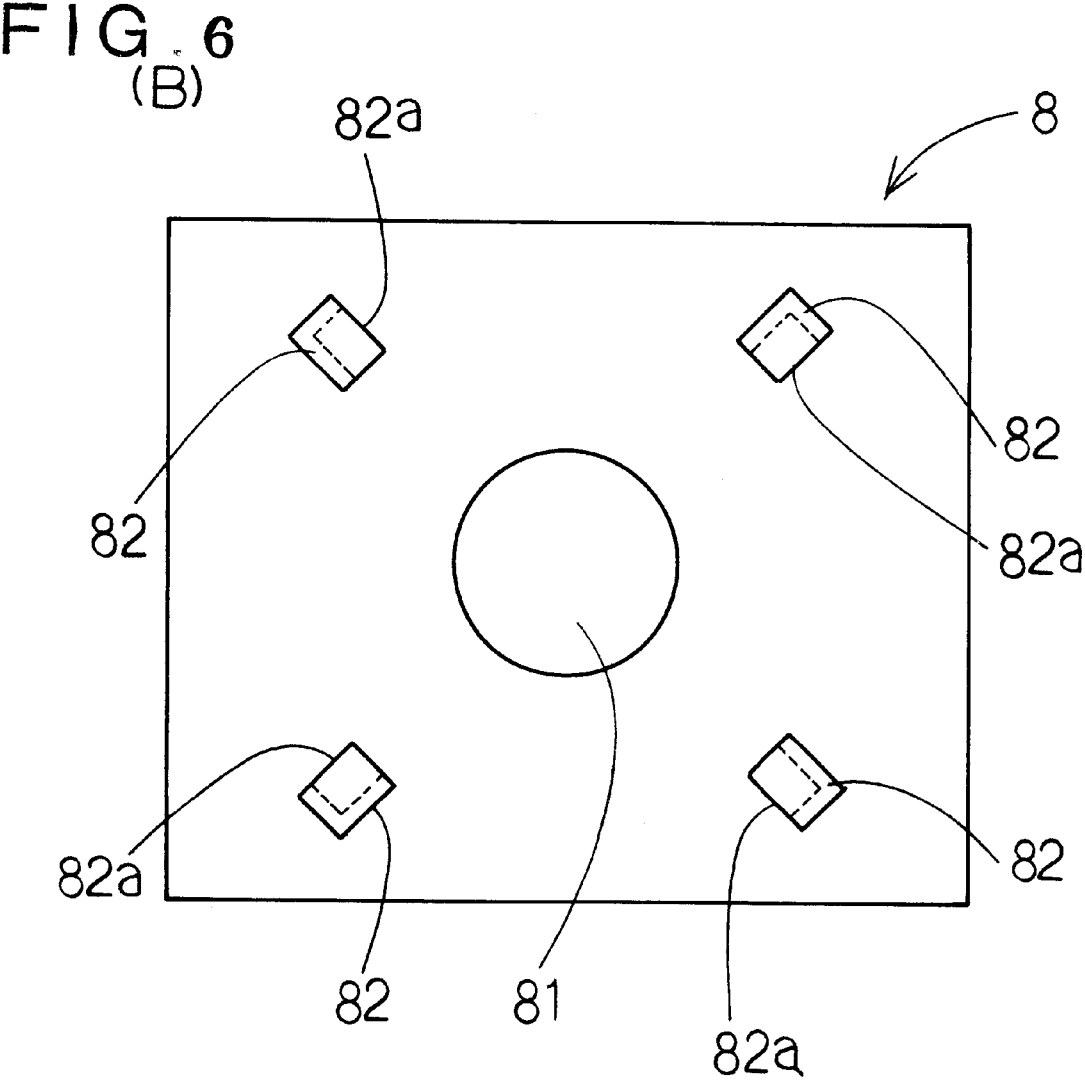

In this embodiment, before mounting a rail fixing bolt n, a washer member 8 is placed on the lower side of the head n1 of the rail fixing bolt n. The washer member 8 used in this embodiment is made of a square plate as shown in FIG. 6, having in the center thereof a threaded portion fit-in hole 81 for receiving the thread portion of bolt n. There are provided four fitment-receptive portions 82 . . . 82 around the thread portion fit-in hole 81. These fitment-receptive portions 82 . . . 82 are intended to unrotatably hold fitments 71 . . . 71 of the casing 2. Each of said fitment-receptive portions may receive each of the fitments 71 . . . 71 of the casing in its inside by means of a portion of the washer body 81 cut and raised in square form in the position corresponding to the fiment 71. An opening 82a is formed between one side of the fitment-receptive portion 82 facing the thread portion fit-in hole 81 and the other side adjacent to the one side. Thus, if with the casing 2 positioned on the washer member 8 and the fitments 71 . . . 71 disposed between the adjacent fitment-receptive portions 82, 82, the casing 2 is turned counterclockwise, the fitments 71 . . . 71 can enter into the raised portions through the openings 82a . . . 82a. The washer member 8 may be made equal to press spring 103 in breadth, having extensions 83, 83 (shown by dotted lines) formed to extend from both sides of the washer member 8 downward. Such extensions 83, 83 allow the press spring 103 to be positioned therebetween so that the washer member 8 will be prevented from turning relative to the press spring 103.

Then, the rail fixing bolt n is held down in a railroad tie 100 with the washer member 8 interposed between the press spring 103 and the head n1 of the rail fixing bolt n. In this connection, the mount member on which rail fixing bolt n as a clamped member is mounted is constituted by the railrod tie 100 as an object in which the rail fixing bolt n is tightened and the press spring 103. For the application of the automatic screw clamping device to the rail fixing bolt n set in position, as shown in FIGS. 7(A)(B), the locking hole 41 of the rotator 4 in a biased position where the rotator 4 is locked to the casing 2 is fitted onto the head n 1 of the rail fixing bolt n so as to abut the lower face of the rotator 4 against the upper face of the washer member 8. Then, the casing 2 is struck with hand or hammer in the surface thereof to go downward. In this case, the casing 2 only descents because the rotator 4 remains inactive. As shown in FIG. 8(B), the bottom plate 7 of the casing 2 comes in contact with the upper face of the washer member 8, almost concurrently followed by detachment of the locking portion 42 of the rotator 4 from the locking hole 32 of the casing 2. This detachment may cause one of the casing 2 and rotator 4 to turn relative to the other, with the result that the casing 2 will change over from the state as shown by FIG. 8(A) to the counterclockwise rotation. This rotary motion of the casing 2 may invite the fitments 71 . . . 71 of the casing 2 to automatically enter into the interior of the fitment-receptive portions 82, 82 of the washer member 8 through the openings 82a . . . 82a until the casing 2 stops turning, as shown in FIG. 8(B). This may enable connection of the casing 2 with the washer member 8, and the fitments 71 . . . 71 encased in the fitment-receptive portions 82, 82 are biassed by the coil spring 5, whereby the fitements can be prevented from coming off from the openings 81a . . . 81a to ensure that the casing 2 will be securely fixed to the washer member 8. After the casing 2 has been fixed to the washer member 8, the rotator 4 will rotate clockwise under the influence of the coil spring 5. This may help turn the rail fixing bolt n clockwise into a tightened position. Along with the tightening of the rail fixing bolt n, the washer member 8 is also pressed by the head n1 of the rail fixing bolt n into a firmly fixed position. After being tightened, the rail fixing bolt n can be kept biassed to run in a direction in which it is further tightened. For example, if the torque of tightening the rail fixing bolt n begins to go down to a lower level because the rail fixing bolt n has been subjected to repetitive vibrations, the rail fixing bolt n can be automatically tightened by means of the elasticity of the coil spring 5, thus resulting in maintenance of the tightening torque at a constant level at all times.

Figure 9:
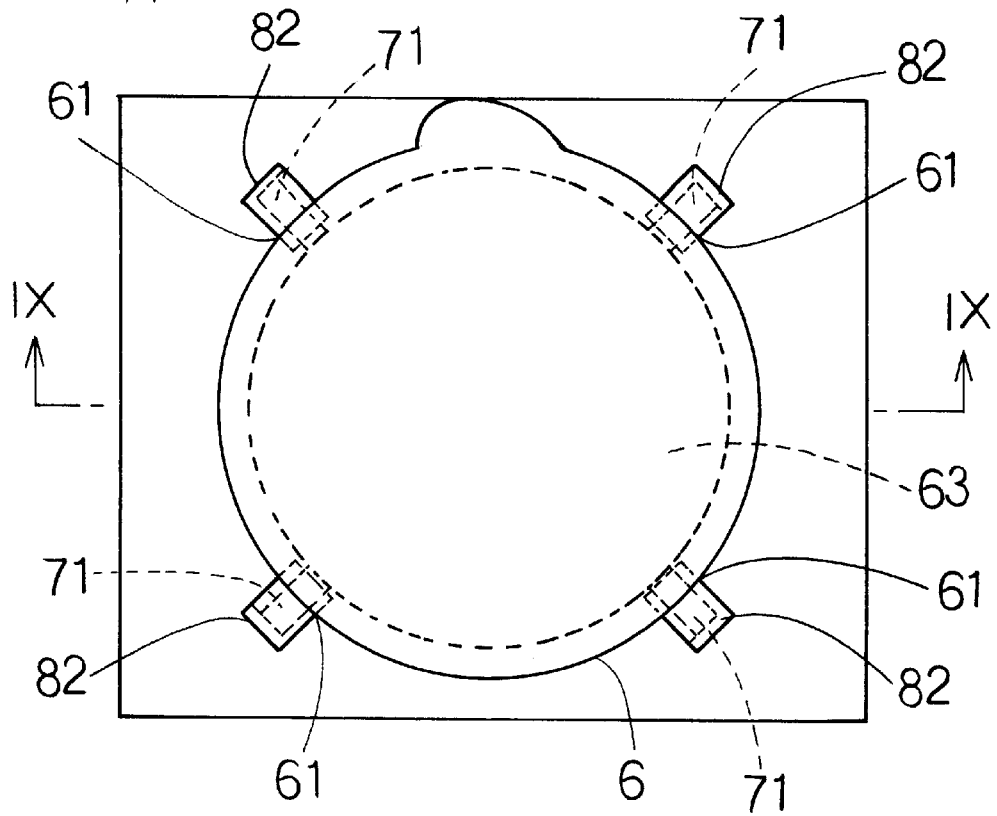
FIG. 9(A) is a plan view showing the state of the casing fixed to the washer member fitted with the covering member, and (B) a sectional view taken along the line IX—IX of (A)
Figure 9:
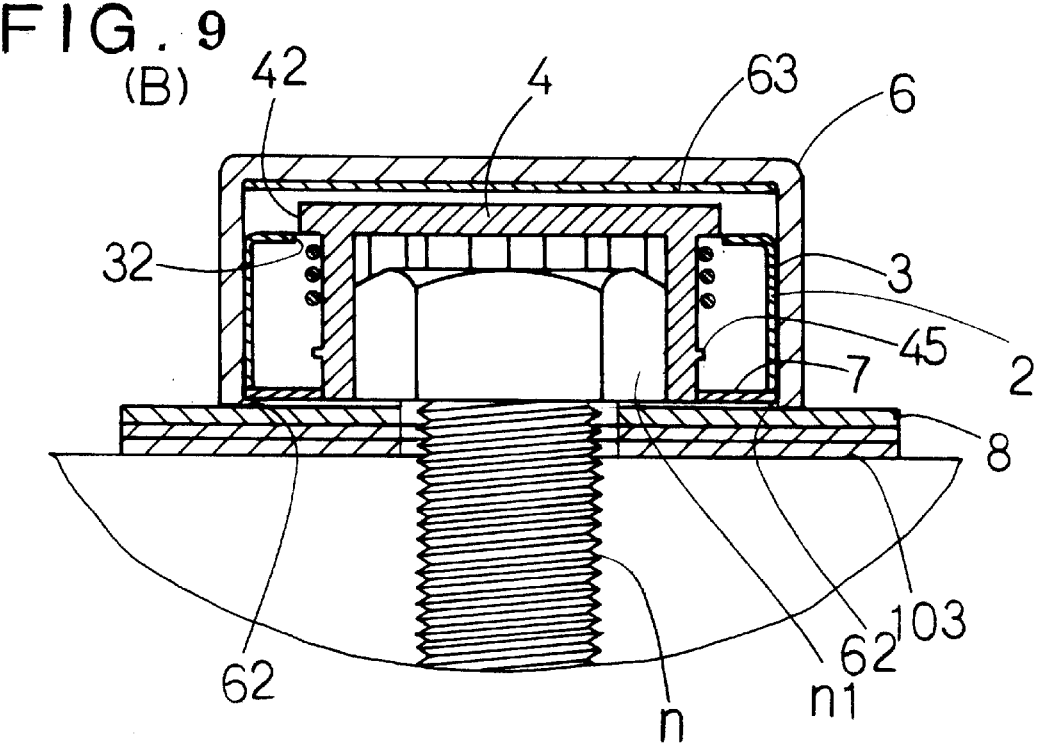
Figure 10:
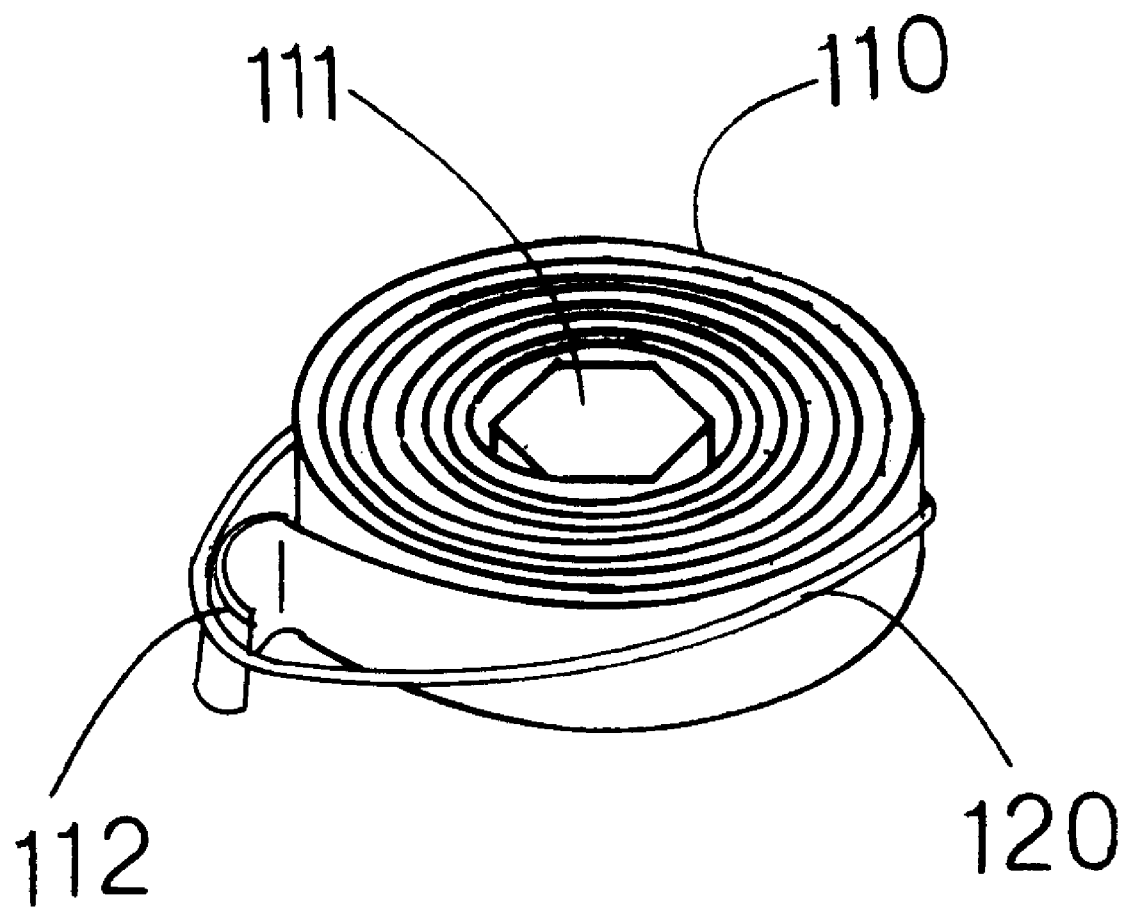
FIG. 10 is a perspective view of the automatic screw clamping device of a second embodiment.

Then, the covering member 6 is put on the casing 2, and as shown in FIGS. 9(A)(B), the fitment-receptive portions 82, 82 of the washer member 8 enter into the fitment-receptive holes 61 . . . 61 of the covering member 6, and simultaneously, the slip-preventive projection 62 of the covering member 6 may force itself into the space between the lower face of the bottom plate 7 of the casing 2 and the upper face of the washer member 8. Consequently, the covering member 6 can neither rotate nor move in a vertical direction under this condition, thereby being completely fixed by the washer member 8. The mounting operation comes to end at this stage.

The described structure makes it possible to securely fix the body portion 1 to the press spring 103 which is hard to nail. Additionally, the casing 2 may be removed from the rotator 4 while the casing 2 is kept engaged with the rail fixing bolt n. This permits fixing of the casing 2 to the washer member 8 under the influence of the elasticity of the coil spring 5. Therefore, the mounting operation can take place easily.

Moreover, now that the rail fixing bolt n can not be manipulated without removing the covering member 6 from the casing 2 capped with said covering member 6, which may prevent other persons from loosening and removing the rail fixing bolt n. Besides, since the covering member 6 is provided with the light reflecting member 63, the covering member 6 can be easily located at the sight of a light reflected from the member 63. For example, the locations of the covering members 6 can be found by a light attached to the existing railroad vehicle, or by a light for exclusive use in identifying the light reflecting member provided on the existing railroad vehicle, as said vehicle runs. If other person has removed the covering member 6 to loosen the rail fixing bolt n, it can be found out instantly.

There is a risk of a lot of iron powder or dust covering the rail fixing bolt n, but the covering member 6 acts to prevent invasion of those substances into the casing 2, which may avoid any functional damage of the coil spring, and thus the rail fixing bolt n can be held in a tightened position.

In this first embodiment is used exclusive washer member 8, but this arrangement should not be restricted to this mode; the fitments 71 . . . 71 of the casing 2 may be fixed to the object acting as the mount member on which the rail fixing bolt n is mounted and combined with the washer member 8, e.g. an object provided with the fitment-receptive portions 82, 82 placed on the washer member 8. Proper variations are permissible.

In the first embodiment, though use is made of covering member 6, this member may not necessarily be used. Proper variations are permissible.

The first embodiment employs the light reflecting member 63, but may not always use this member. If used, the light reflecting member 63 is not especially limited in its position. For example, it may be disposed on the upper side of the top face of the covering member 63, or the inside or outside of the side face of the covering member 63, or a part of the casing 2. Proper variations are permissible.

The first embodiment uses a coil spring as biasing means, but for example, a coiled steel leaf spring may be used. Proper variations are permissible.

Next, an automatic screw clamping device in accordance of a second embodiment will be described.

The automatic screw clamping device of the second embodiment comprises a coiled spring 110 as a biasing means, and a retainer member 120 for retaining the coiled spring 110 in a winding-elastic condition. This device does not have a casing 2 as used in the first embodiment. There is provided on the inner peripheral end of the coiled spring 110 an engaging hole 111 serving to engage a clamped member n in a manner that the clamped member n is kept from rotating. The engagement hole 111 may be formed by bending the inner peripheral side of the coiled spring 110 into a hexagonal form. This engagement means may not necessarily have such a structure. For example, it may be arranged such that the rotator 4 with an engaging hole 41 (as in the previous embodiment) is attached to the inner peripheral end of the coiled spring 110, or an engaging piece is positioned in a manner that it may engage a groove formed in the clamped member, or the clamped member is mounted in the inner peripheral end of thereof in advance.

There is provided on the outer peripheral end of the coiled spring 110 a catching piece 112 as an attachment for catching on a washer member 800 as explained afterward. This catching piece 112 is formed by bending the outer peripheral end of the coiled spring 110 into an alphabetical U.

The retaining member 120, which is made of a string-formed member, is so wound around the entire outer periphery of the coiled spring 110 with winding elasticity that it may serve to prevent the coiled spring 110 from spreading because of the winding elasticity, whereby the coiled spring 110 is retained in a winding-elastic condition.

Figure 11:
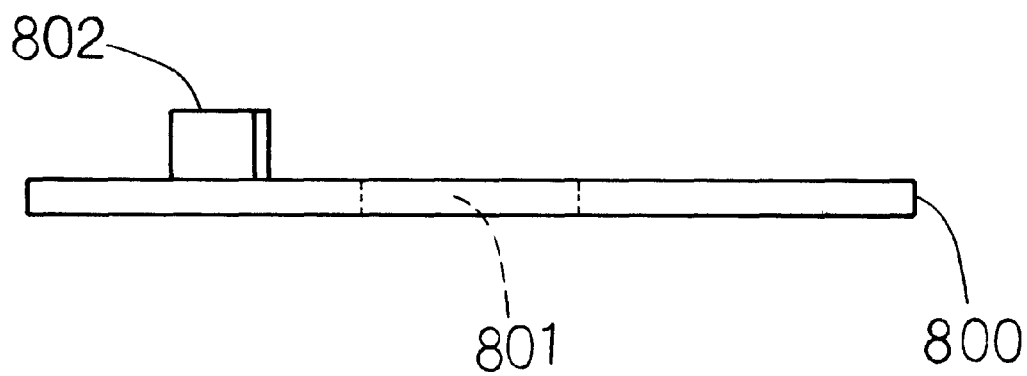
FIG. 11(A) is a front view of the washer member for use in the automatic screw clamping device of the first embodiment, and (B) a plan view of same.
Figure 11:
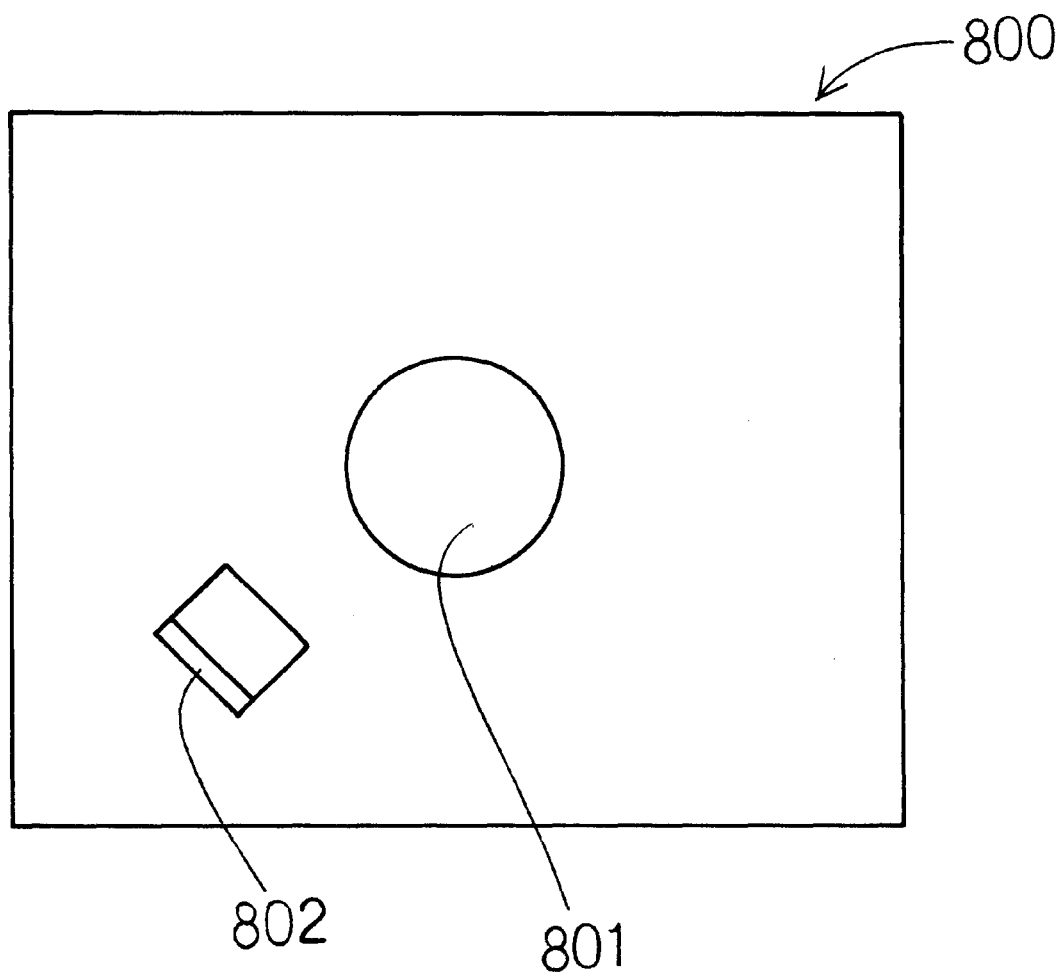

The washer member 800 for use with the automatic screw clamping device in accordance with the second embodiment is shown in FIG. 11. Specifically, the washer member 800 is constituted by a square member and includes in its central portion a threaded shank fit-in hole 801 for receiving the threaded shank of a bolt n. The threaded shank fit-in hole 801 has on its left-hand side a projecting fitment-receptive portion 802 which is formed by cutting and raising a part of the washer member 800. The automatic screw clamping device of the second embodiment may be used in the rail fixing bolt n as described in the first embodiment in the following manner.

Figure 12:
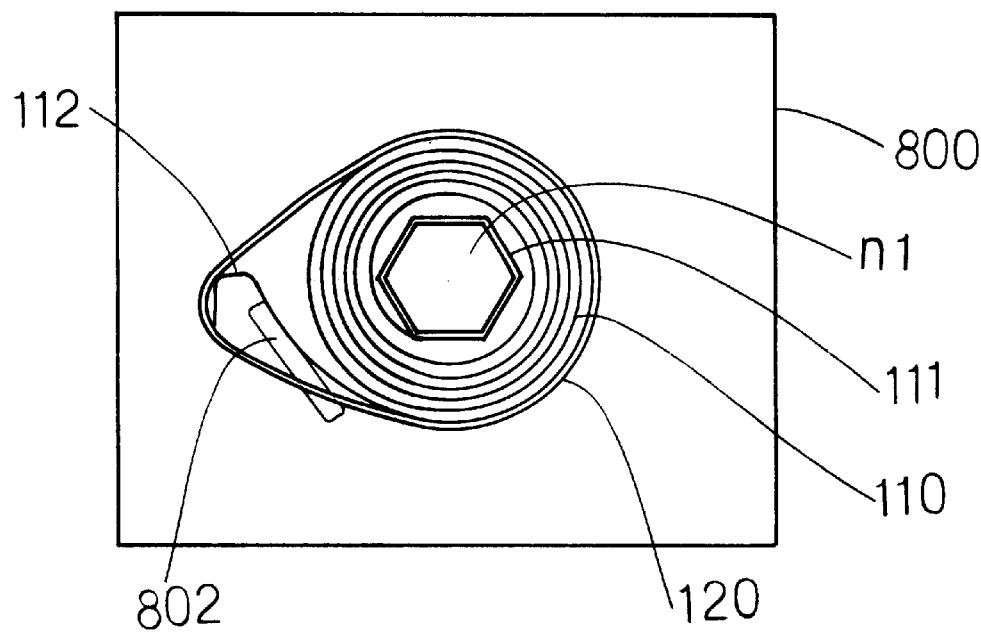
FIG. 12(A) is a view explanatory of the automatic screw clamping device of the second embodiment as viewed from above when it is mounted on the fixing bolt for rail, and (B) a view explanatory of the body portion in accordance with the second embodiment viewed from the front when it is mounted on the fixing bolt for rail.
Figure 12:
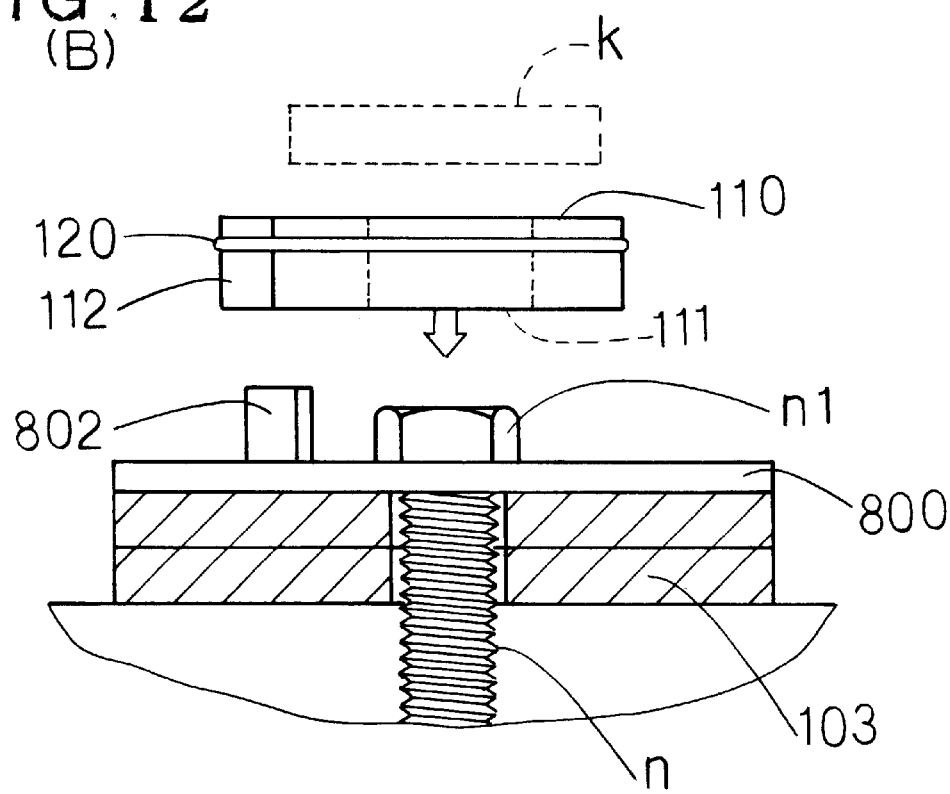
Figure 13:
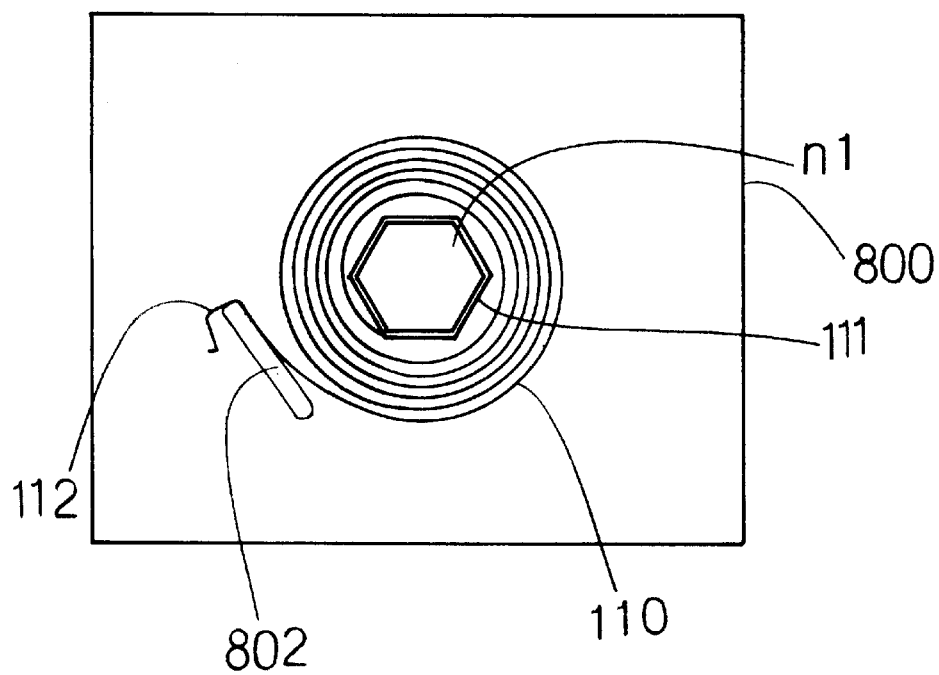
FIG. 13(A) is a plan view showing the state of the automatic screw clamping device of the second embodiment sitting on the fixing bolt for rail, and (B) a frontal section view showing some of the state of the automatic screw clamping device of the second embodiment sitting on the fixing bolt for rail.
Figure 13:
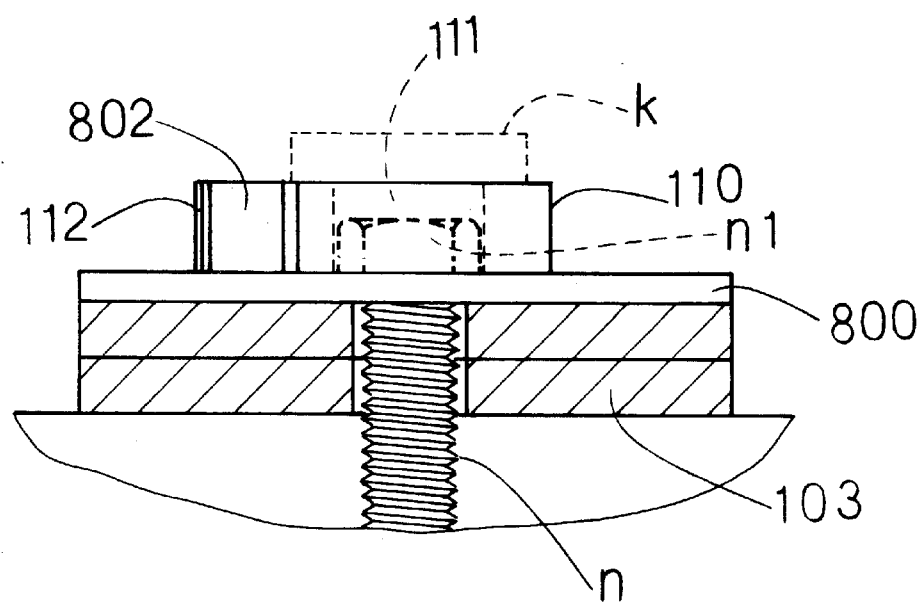
Figure 14:
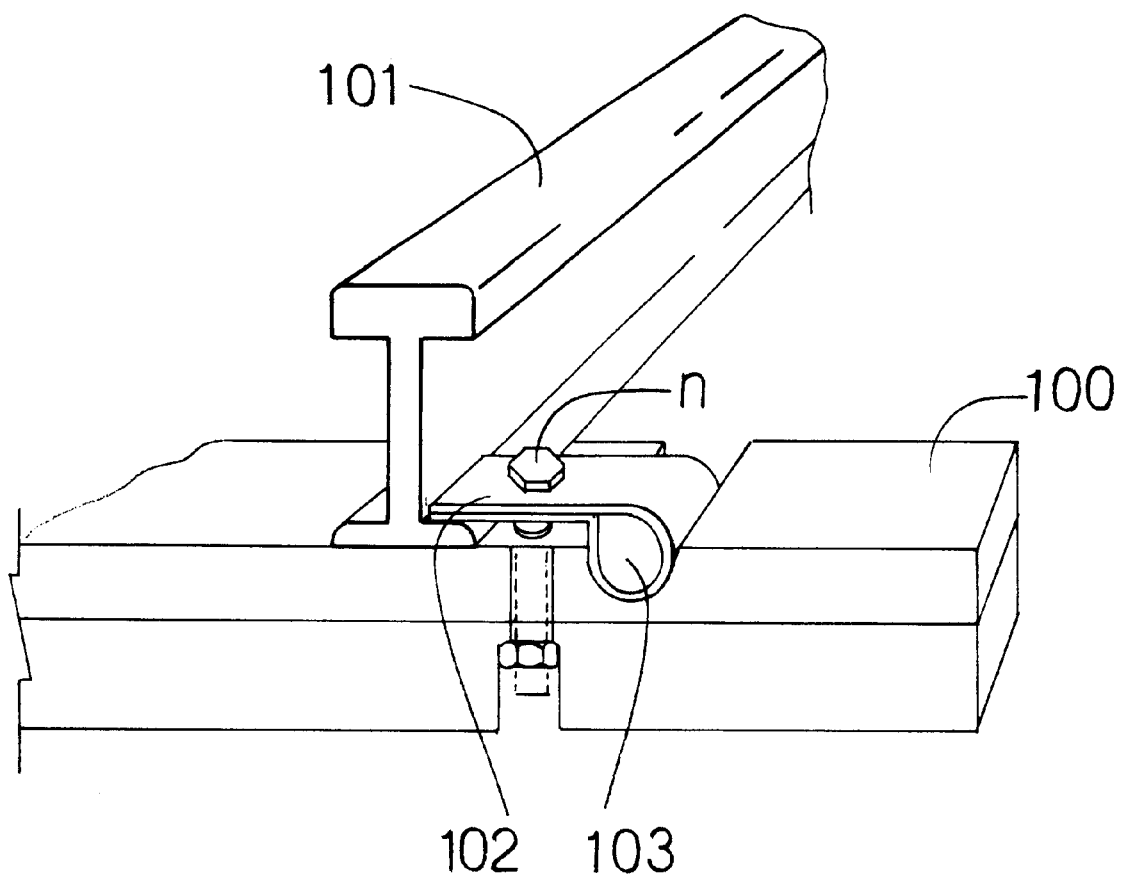
FIG. 14 is a view explanatory of the state of the rail fixed in position under the pressure of the fixing bolt for rail, while pressing down a spring.
Figure 15:
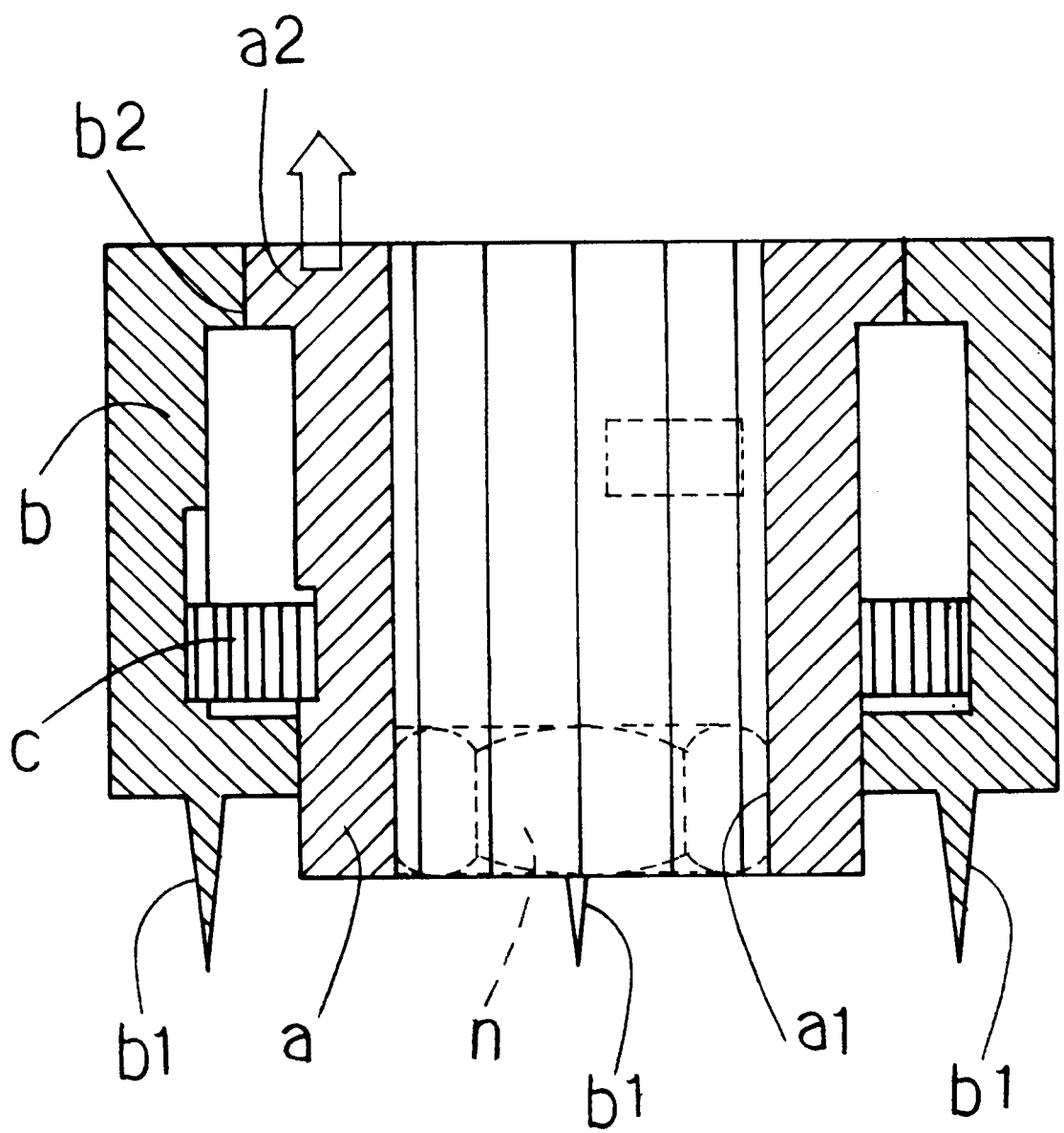
FIG. 15 is a sectional view of a building strap bolt of a conventional type.

As shown in FIGS. 12(A)(B), the coiled spring 110 is positioned above the rail fixing bolt n so as to align the engaging hole 111 of the coiled spring 110 with the rail fixing bolt n, and the catching piece 112 of the coiled spring 110 with the fitment-receptive portion 802 of the washer member 800, and the coiled spring 110 is pressed down. It may be done by hand, but if the coiled spring 110 is struck on the upper face using a plate-like tooling K as shown by a dotted line in FIG. 12(B), the whole coiled spring 110 can be pushed down at a stretch. This latter method is preferable in that the pressing can be simply achieved. Then, as shown by FIGS. 13(A)(B), as the coiled spring 110 goes down, the engaging hole 111 of the coiled spring 110 is fitted onto the head nl of the rail fixing bolt n, and concurrently therewith, the bent portion of the catching piece 112 of the coiled spring 110 enters into the end of the fitment-receptive portion 802, but the retaining member 120 wound around the outer periphery of the coiled spring 110 hits the upper end of the fitment-receptive portion 802 of the washer member 800 and can not move downward, with the consequence that the coiled spring 110 only descends with the retaining member 120 left behind, so that the retaining member 120 will come off from the upper side of the coiled spring 110. In this connection, the catching piece 112 of the coiled spring 110 can catch the fitment-receptive portion 802 of the washer member 800 by virtue of the winding elasticity of the coiled spring 110, and on the other hand, the rail fixing bolt n received by the engagement hole 111 can remain biased in a direction in which it runs for being tightened.

This makes it possible to securely fix the body portion to the press spring 103 which is hard to nail, and besides, all what can be done is to fit the engaging hole 111 of the coiled spring 110 onto the rail fixing bolt n. This may make the mounting operation simple; the retaining member 120 can be removed without nailing operation as done in the past, and can be securely fixed to the washer member 8 by the winding elasticity of the coiled spring 110. In addition, this embodiment will do without casing or rotator 4 as in the body portion 1 of the first embodiment. Therefore, the structure may be made simple, the production cost is low, and a good economy can be achieved.

Though the second embodiment does not use covering member, it does not matter if this embodiment goes with the covering member. For example, the washer member 800 may be provided with a locking means for locking the covering member to the washer member 800, so that the covering member placed over the coiled spring 110 set in position may be locked to the washer member 800. This arrangement may prevent iron powder or dust from settling on the coiled spring, thus resulting in avoidance of functional damage of the coiled spring to such an extent that the rail fixing bolt n will be kept biassed toward a direction in which it runs for being tightened. Provision of a light reflecting member on the covering member as used in the first embodiment is preferable in that the location of the covering member can be easily identified.

Though the fitment-receptive portion 802 of the washer member 800 as used in the second embodiment is constituted by a projection formed by a cut and raised part of the washer member 800, any other thing that may be caught by the catching piece 112 of the coiled spring 110 will do. Proper variations are permissible.

In accordance with the second embodiment, in the operation of fixing the coiled spring 110 to the washer member 800, the retaining member 120 is arranged such that it should be automatically removed from the coiled spring 110. Instead of such a structure, for example, the engaging hole 111 of the coiled spring 110 may be fit on the rail fixing bolt n ,and the locking piece provided on the outer peripheral end of the coiled spring 110 is fit in the locking groove formed on the washer member respectively before removing the retaining member 120 as by cutting it. Proper variations are permissible.

Furthermore, as in the first embodiment, this second embodiment does not use an exclusive washer member 800 but a press spring 103 having means which can be caught by the catching piece 112 of the coiled spring 110. Proper variations are permissible. The above is the description of the second embodiment.

The automatic screw clamping device in accordance with the present invention may be applied not only to the rail fixing bolt n firmly secured to the railroad rail 101 as described above but also to various types of bolts and nuts. Bolts for exclusive use in pylons can be prevented from loosening if they are used together with said washer members 8, 800. The locations of the automatic screw clamping devices attached to the said bolts could be identified by shining a beam of light at the pylons, and any bolt loosened by other persons could be detected instantly on the ground. For example, if the bolts for exclusive use in pylons are used in conjunction with the washer members 800, the pylons to which bolts are to be applied provide an object with bolt attachment, and a combination of the pylons and washer members 8, 800 constitutes a mount member with bolts attached thereto. Even if the mount member with bolt and nut attached thereto is made of a substance which is hard to nail, such as metal or concrete, the automatic screw clamping device of the present invention may be easily and unrotatably fitted to the mount member. Said device is especially adaptable to bolts or nuts being fitted to the mount members which are hard to nail, and also available for bolts or nuts being attached to wood. Proper variations are permissible.

With the first to third inventions, the biasing member (5, 110) can be also fixed by the other ends thereof to a member which are hard to nail, while biasing clamped members n in a direction in which it runs for being tightened. Additionally, unlike the conventional practice, the mounting operation is simple in that the biasing member (5, 110) may be automatically fitted by the other end thereof to the mount member(8, 800) under the influence of the elastic force of the coil spring 1 without using nails.

In accordance with the fourth invention, the mounting operation is simple in that the casing 2 may be detached from the rotator 4 by engaging the rotator 4 with the clamped member n, so that the casing 2 may be turned by the biasing force from the biasing member 5. Upon turning, the casing 2 and the mount member 8 may be automatically and unrotatably joined together.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic screw clamping device comprising:

a tubular casing;

a rotator disposed in said tubular casing, said rotator is movable in a vertical direction of an axis of the screw clamping device, said rotator having an engaging portion formed at a lower end of said rotator, whereby said rotator is unrotatably engaged with a clamped member;

a biasing member for biasing said clamped member, wherein said biasing member is connected with said rotator at one end thereof, and with said tubular casing at the other end, wherein said tubular casing and said rotator provides a biasing force, and wherein said rotator and said tubular casing become rotatable relative to each other when a turning force is applied;

locking means provided on said tubular casing and said rotator wherein said tubular casing and said rotator may removably be locked to each other, whereby said rotator remains in said tubular casing in a biased positioned to hold a given turning force, said locking means providing a lock joint between said tubular casing and said rotator and said lock joint being removed as said rotator is urged upwardly relative to said tubular casing; and fitting means for joining said tubular casing and a mount member with said clamped member attached thereto in an unrotatable manner, so that said fitting means may permit said tubular casing to rotate under the influence of said biasing force of said biasing member applied to said tubular casing, and upon such rotation, said tubular casing and said mount member being unrotatably joined together, whereby said rotator in an engaged relationship with said clamped member may bias said clamped member in a direction when said rotator is being tighten.

* * * * *